US011479363B2

(12) United States Patent
Gormley et al.

(10) Patent No.: US 11,479,363 B2
(45) Date of Patent: Oct. 25, 2022

(54) TOTAL UNDERWING NACELLE AND ENGINE INSTALLATION

(71) Applicant: ROHR, INC., Chula Vista, CA (US)

(72) Inventors: Timothy Gormley, Bonita, CA (US); Jihad Ramlaoui, Chula Vista, CA (US); Vincent Vignoboul, Pelleport (FR); Timothy Repp, Chula Vista, CA (US); Jasen Miner, San Diego, CA (US); Luis A. Lopez, Chula Vista, CA (US); Duffy Adam Randolph, El Cajon, CA (US); Erik N. Linde, Coronado, CA (US)

(73) Assignee: Rohr, Inc., Chula Vista, CA (US)

( * ) Notice: Subject to any disclaimer, the term of this patent is extended or adjusted under 35 U.S.C. 154(b) by 139 days.

(21) Appl. No.: 16/865,043

(22) Filed: May 1, 2020

(65) Prior Publication Data

US 2020/0361617 A1 Nov. 19, 2020

Related U.S. Application Data

(60) Provisional application No. 62/849,584, filed on May 17, 2019.

(51) Int. Cl.
*B64D 27/26* (2006.01)
*B64D 27/18* (2006.01)

(52) U.S. Cl.
CPC ............. *B64D 27/26* (2013.01); *B64D 27/18* (2013.01); *B64D 2027/264* (2013.01); *B64D 2027/266* (2013.01); *B64D 2027/268* (2013.01)

(58) Field of Classification Search
CPC .. B64D 27/26; B64D 27/18; B64D 2027/264; B64D 2027/266; B64D 2027/268
See application file for complete search history.

(56) References Cited

U.S. PATENT DOCUMENTS

| 2,920,773 | A | * | 1/1960 | Knabe | B64F 5/50 |
| | | | | | 414/754 |
| 4,440,265 | A | * | 4/1984 | Spagnoli | B64F 5/50 |
| | | | | | 182/141 |
| 4,660,796 | A | * | 4/1987 | Garrec | B65D 85/68 |
| | | | | | 414/589 |

(Continued)

FOREIGN PATENT DOCUMENTS

| EP | 0066548 | 12/1982 |
| WO | 2007137812 | 12/2007 |

OTHER PUBLICATIONS

European Patent Office, European Search Report dated Oct. 22, 2020 in Application No. 20175039.5.

*Primary Examiner* — Richard R. Green
*Assistant Examiner* — Steven J Shur
(74) *Attorney, Agent, or Firm* — Snell & Wilmer L.L.P.

(57) ABSTRACT

A method of assembling and installing an underwing package to an underside of an aircraft wing is disclosed. In various embodiments, the method includes assembling the underwing package, comprising at least a pylon and an engine, using a build frame; attaching a transfer cart to the underwing package; lowering the underwing package and the transfer cart from the build frame; transporting the underwing package and the transfer cart to the underside of the aircraft wing; and transferring the underwing package from the transfer cart to the underside of the aircraft wing.

15 Claims, 14 Drawing Sheets

(56) References Cited

U.S. PATENT DOCUMENTS

| | | | | |
|---|---|---|---|---|
| 5,653,351 | A * | 8/1997 | Grout | F01D 25/285 |
| | | | | 212/315 |
| 6,485,247 | B1 * | 11/2002 | Groves | B64F 5/50 |
| | | | | 180/125 |
| 8,469,309 | B2 * | 6/2013 | Stuart | B64D 27/18 |
| | | | | 60/797 |
| 8,876,042 | B2 | 11/2014 | LaChapelle et al. | |
| 9,885,286 | B2 * | 2/2018 | Murphy | F01D 25/285 |
| 9,889,942 | B2 | 2/2018 | Pautis et al. | |
| 10,295,970 | B2 | 5/2019 | Iliopoulos et al. | |
| 2005/0198797 | A1 * | 9/2005 | Appleton | B64F 5/50 |
| | | | | 29/469 |
| 2015/0251774 | A1 * | 9/2015 | Mercier | F01D 25/285 |
| | | | | 29/281.1 |

* cited by examiner

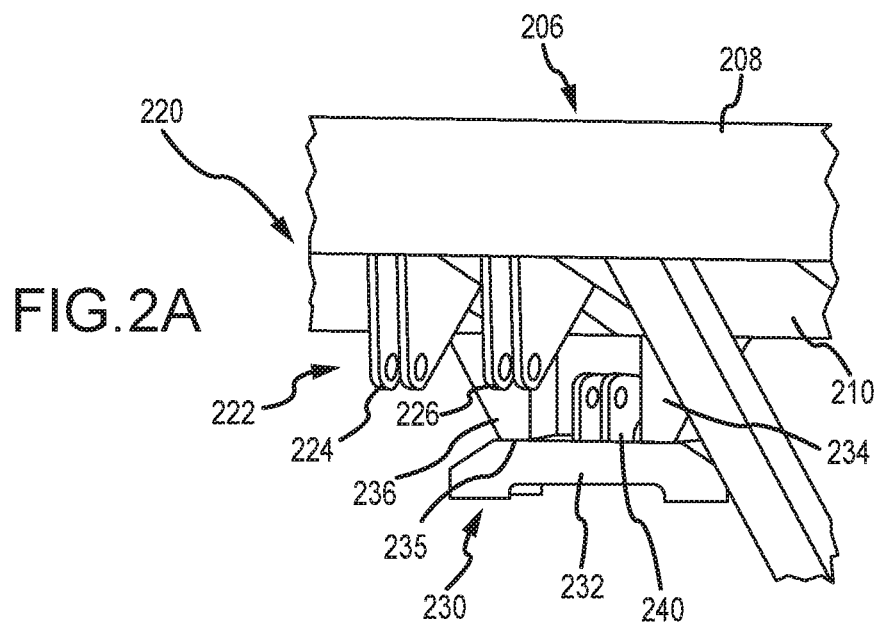
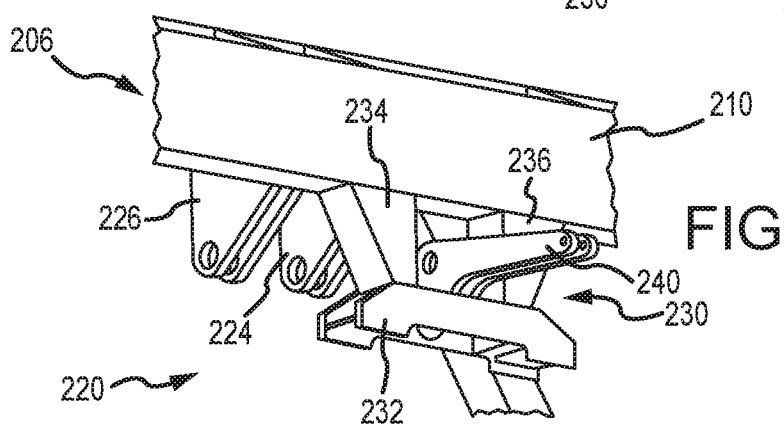
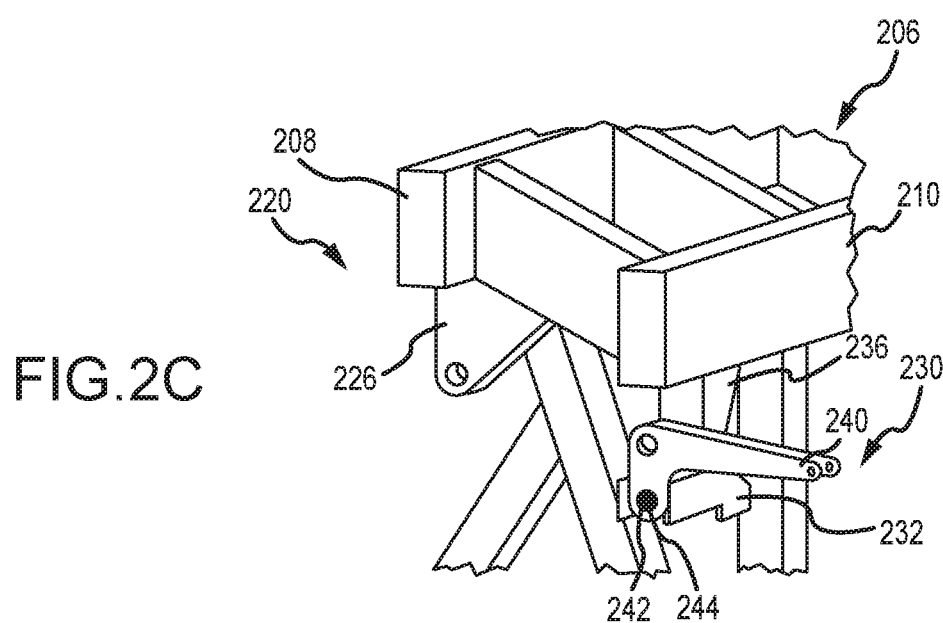

TOTAL UNDERWING NACELLE AND ENGINE INSTALLATION

CROSS-REFERENCE TO RELATED APPLICATIONS

This application is a non-provisional application claiming priority to U.S. Prov. Appl. 62/849,584, entitled "TOTAL UNDERWING NACELLE AND ENGINE INSTALLATION," filed on May 17, 2019, the entirety of which is hereby incorporated by reference herein for all purposes.

FIELD

The present disclosure relates generally to engine systems for jet aircraft and, more particularly, to apparatus and methods used to assemble and install jet engine systems to the underwing surfaces of jet aircraft.

BACKGROUND

Modern aircraft may utilize one or more gas turbine engines for propulsion. The engines may be housed in a nacelle, which may be wing-mounted, fuselage-mounted or tail-mounted or some combination thereof. Current methods of assembly and installation of engine systems typically involve multiple iterations of installing, rigging, removing for transport, reinstallation, checking and potentially re-rigging of large and expensive hardware. The process is expensive, potentially wasteful and may render hardware prone to damage. Additionally, the various large components of the engine systems, such as, for example, the thrust reverser and the fan cowls are not always rigged or positioned correctly in their final underwing configurations since the interface structure may not be present in a normal flight configuration (e.g., in a configuration that accommodates typical flexing of the wing and pylon).

In a typical installation of a jet engine to the underwing surface of an aircraft, or to a torque box located within the wing, several steps are undertaken. In a first step, it is conventional to attach a pylon to the wing. In a second step, the engine is attached to the pylon, without any of the surrounding structure—e.g., the inlet cowl, the left and right fan cowls and the thrust reversers. In a third step, the surrounding structure is attached to the engine. The pylon is a structural member that provides a structural connection between the wing and the engine and typically comprises a forward connection or attachment point and an aft connection or attachment point. During the second step, the engine is manipulated manually until the connection or attachment points between the pylon and the engine are correctly aligned, at which point the engine may be secured to the pylon. Engines are heavy, however, and manipulation of the engine with respect to the pylon and wing may become difficult and should be avoided, if possible. Out of tolerance errors with the connection or attachment points between the pylon and the engine may exacerbate the procedure, leading to costly delays due to multiple attempts or iterations at attaching the engine to the pylon and wing. Further exacerbating the procedure is the difficulty in manipulating the increasingly larger and heavier engines used on modern commercial or military aircraft.

SUMMARY

A method of assembling and installing an underwing package to an underside of an aircraft wing is disclosed. In various embodiments, the method includes assembling the underwing package, comprising at least a pylon and an engine, using a build frame; attaching a transfer cart to the underwing package; lowering the underwing package and the transfer cart from the build frame; transporting the underwing package and the transfer cart to the underside of the aircraft wing; and transferring the underwing package from the transfer cart to the underside of the aircraft wing.

In various embodiments, transferring the underwing package from the transfer cart to the underside of the aircraft wing includes raising the transfer cart and the underwing package to the underside of the aircraft wing until the pylon is aligned with an attachment point at the underside of the aircraft wing. In various embodiments, the method further includes attaching the pylon to the attachment point at the underside of the aircraft wing, thereby securing the underwing package to the aircraft wing. In various embodiments, lowering the transfer cart from the underwing package after securing the underwing package to the aircraft wing.

In various embodiments, assembling the underwing package includes attaching the pylon to the build frame. In various embodiments, attaching the pylon to the build frame includes attaching a forward attachment point of the pylon to a forward fitting of the build frame. In various embodiments, attaching the pylon to the build frame includes releasably attaching an aft transfer system to the build frame and attaching an aft attachment point of the pylon to the aft transfer system. In various embodiments, the aft transfer system includes a crank that is pivotally connected to a transfer fitting and the step of attaching the aft attachment point of the pylon to the aft transfer system includes attaching the aft attachment point of the pylon to the crank.

In various embodiments, assembling the underwing package includes attaching the engine to the pylon after attaching the forward attachment point of the pylon to the forward fitting of the build frame and attaching the aft attachment point of the pylon to the aft transfer system.

In various embodiments, attaching the transfer cart to the underwing package includes raising the transfer cart to an attachment position with respect to the underwing package. In various embodiments, attaching the transfer cart to the underwing package includes releasably attaching a support member connected to the transfer cart to the aft transfer system. In various embodiments, attaching the transfer cart to the underwing package includes attaching a halo structure to the transfer cart and connecting the halo structure to the engine. In various embodiments, attaching the transfer cart to the underwing package includes connecting a thrust link between the aft transfer system and the transfer cart. In various embodiments, the method includes releasing the aft transfer system from the build frame and releasing the forward attachment point of the pylon from the forward fitting of the build frame, followed by lowering the underwing package and the transfer cart from the build frame.

In various embodiments, connecting the halo structure to the engine includes connecting a harness between an upper portion of the engine and the halo structure. In various embodiments, connecting the halo structure to the engine includes connecting a first side link between a first side of the engine and the halo structure and a second side link between a second side of the engine and the halo structure.

An aft transfer system for use with a build frame and a transfer cart during an assembly and installation of an underwing package, including a pylon, to an underside of an aircraft wing is disclosed. In various embodiments, the aft transfer system includes a transfer fitting configured for releasable attachment to the build frame and for releasable attachment to the transfer cart; and a crank pivotally connected to the transfer fitting and configured for releasable attachment to an aft attachment point of the pylon.

In various embodiments, the transfer fitting includes a first plate configured for releasable attachment to a flange connected to the build frame. In various embodiments, the transfer fitting includes a second plate configured for releasable attachment to a support member connected to the transfer cart. In various embodiments, the system includes a thrust link having a first end configured for attachment to the crank and a second end configured for attachment to an aft end of the transfer cart.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 2A, 2B and 2C illustrate a build and transfer system, in accordance with various embodiments;

The foregoing features and elements may be combined in any combination, without exclusivity, unless expressly indicated herein otherwise. These features and elements as well as the operation of the disclosed embodiments will become more apparent in light of the following description and accompanying drawings.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
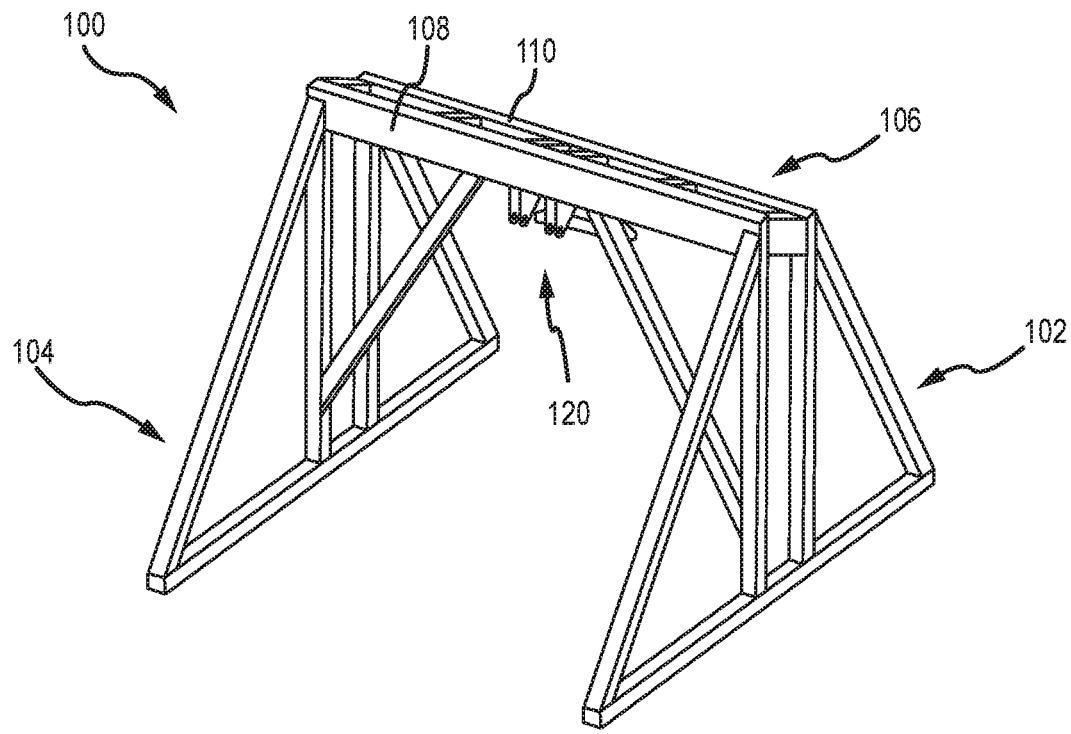
FIGS. 1A, 1B and 1C illustrate a build frame having a build and transfer system, in accordance with various embodiments.
Figure 1B:
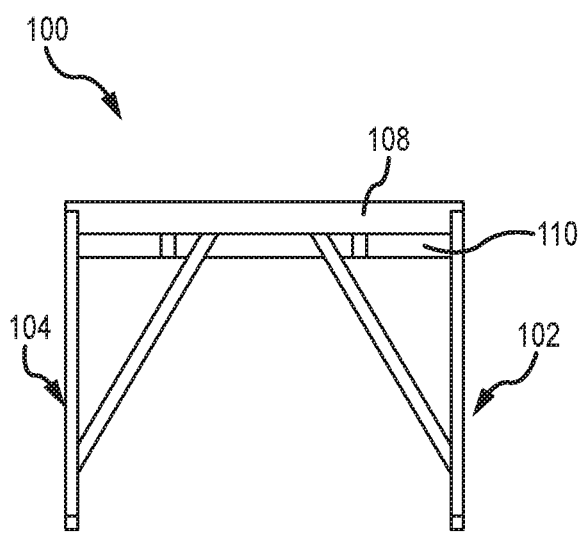
Figure 1C:
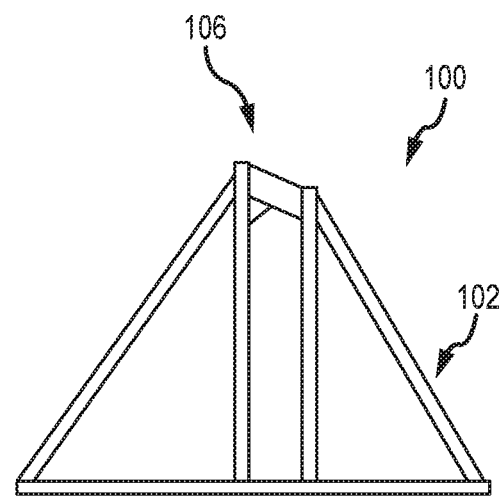

Referring now to the drawings, FIGS. 1A, 1B and 1C illustrate various perspectives of a build frame 100 (or a podding frame), configured for constructing a podded engine—i.e., an engine attached to a pylon and having one or more components of its surrounding structure attached. In various embodiments, the build frame 100 includes a first side frame 102 and a second side frame 104 that are configured to support a transverse frame 106. In various embodiments, the transverse frame 106 includes a first transverse beam 108 (or a forward transfer beam) and a second transverse beam 110 (or an aft transverse beam) configured to support a build and transfer system 120. The build and transfer system 120, as explained in further detail below, is configured to replicate the forward and aft attachment points of a wing, or a torque box within the wing, to which a pylon is secured. As also explained in further detail below, the build and transfer system 120 is configured to enable an engine to be built on the build frame 100, transferred to a cart, and then transferred to the underside of an aircraft wing by the cart, raised in elevation by a power lift device, and attached to the underside of the aircraft wing. Following attachment to the wing, the build of the engine may be completed to include the surrounding structure not already attached to the engine.

Referring now to FIGS. 2A, 2B and 2C, a build and transfer system 220, similar to the build and transfer system 120 described above, is illustrated. In various embodiments, the build and transfer system 220 is attached to an underside of a transverse frame 206, similar to the transverse frame 106 described above. Also similar to the transverse frame 106 described above, the transverse frame 206, in various embodiments, may include a first transverse beam 208 (or a forward transverse beam) and a second transverse beam 210 (or an aft transverse beam) configured to support the build and transfer system 220. In various embodiments, the build and transfer system 220 includes a forward fitting assembly 222 (or a forward fitting), which is configured to replicate a forward attachment point of the wing structure to which a forward attachment point of a pylon is attached. While the forward fitting assembly 222 is illustrated as having a first forward flange 224 (or a first forward flange pair) and a second forward flange 226 (or a second forward flange pair), other structures are contemplated, the details of which will depend on the structure of the forward connection points of both the wing and the pylon. In various embodiments, the forward fitting assembly 222 may be secured or attached to the transverse frame 206 via bolts or welds or some other suitable mode of attachment.

Still referring to FIGS. 2A-2C, the build and transfer system 220 also includes an aft transfer system 230, which is configured to replicate an aft attachment point of the wing structure to which an aft attachment point of the pylon is attached. In various embodiments, the aft transfer system 230 includes an aft transfer fitting 232 that is releasably secured to a first aft flange 234 and a second aft flange 236, both of which may be secured or attached to the transverse frame 206 via bolts or welds or some other suitable mode of attachment. In various embodiments, the aft transfer system 230 includes a crank 240 that is pivotally connected to the aft transfer fitting 232 via a first pin 242 configured to extend through a first aperture 244 and to mate with mounting structure within the transfer fitting 232 such that the crank 240 is enabled to pivot with respect to the transfer fitting 232. Without loss of generality, in various embodiments, the transfer fitting 232 may comprise an H-beam or similar type of member and the crank 240 may comprise a pair of plates that are spaced apart and welded or bolted together. Further details of the aft transfer system 230 are provided below when describing transfer of an engine attached to a pylon from a build frame to a transfer cart.

Figure 3A:
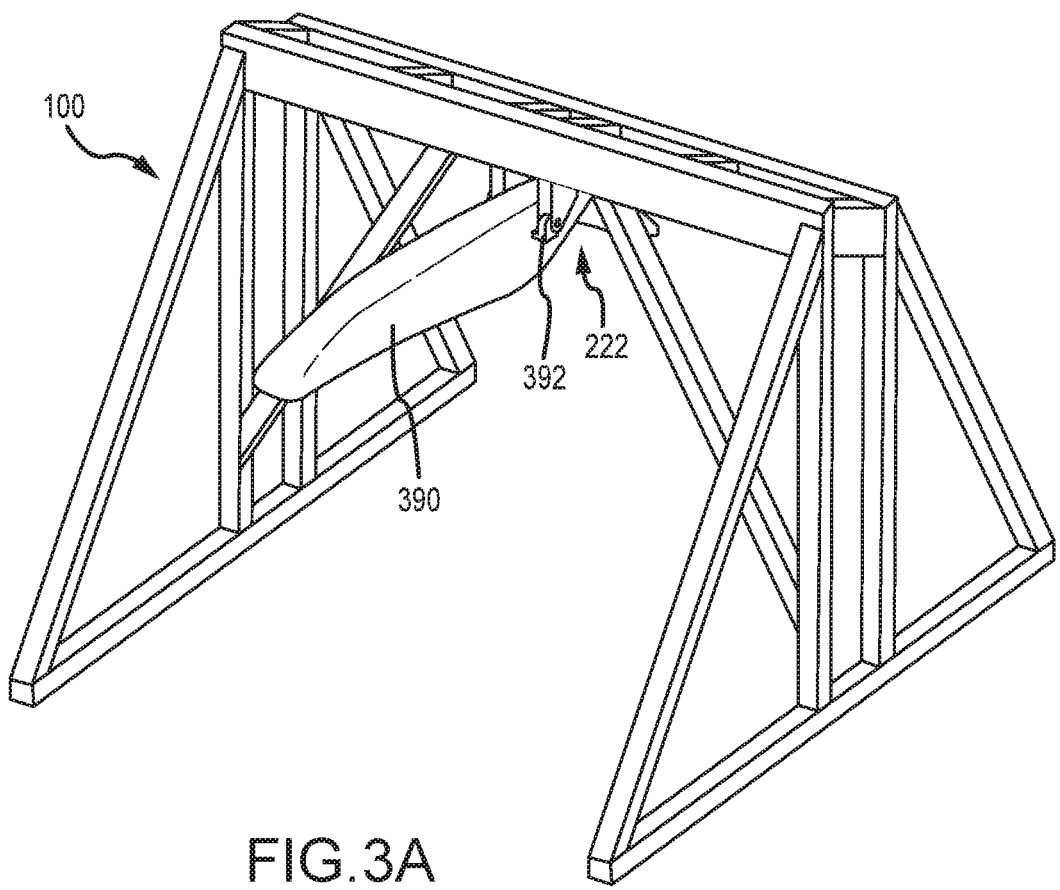
FIGS. 3A, 3B and 3C illustrate a pylon attached to a build and transfer system having an aft transfer system, in accordance with various embodiments.
Figure 3B:
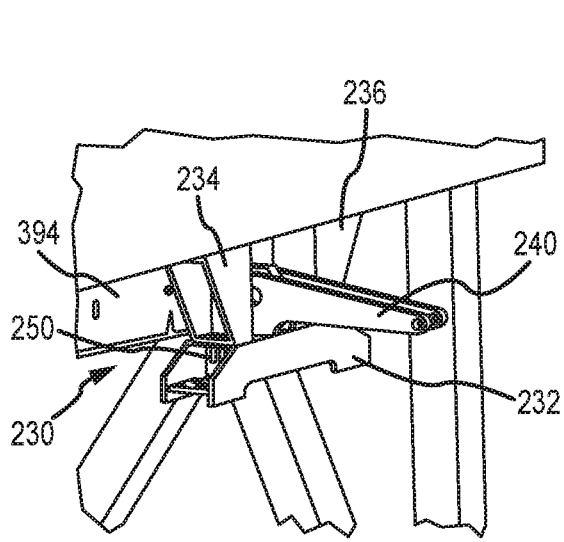
Figure 3C:
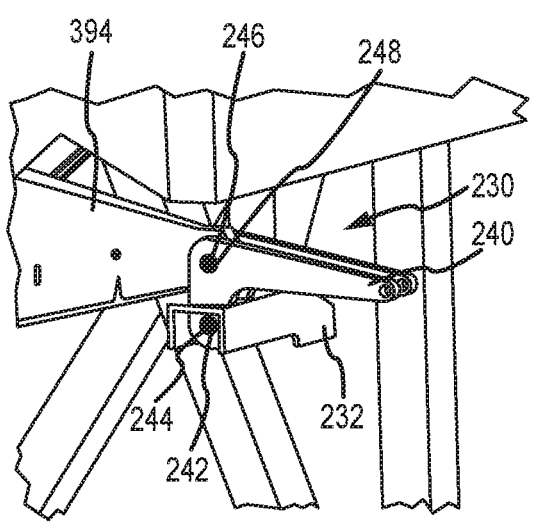

Referring now to FIGS. 3A-3C, 4-5, 6A-6D and 7-12, various steps are described with respect to a method of assembling and installing an underwing package to an underside of an aircraft wing, the underwing package generally comprising a pylon and an engine attached to the pylon, in accordance with various embodiments. The various steps are generally described with reference to the build frame 100 and the build and transfer system 220 described above and illustrated at FIGS. 1 and 2A-2C. Referring first to FIGS. 3A, 3B and 3C, a first step includes attaching a pylon 390 to the build frame 100. More specifically, a forward attachment point 392 of the pylon 390 is attached to the forward fitting assembly 222, as illustrated at FIG. 3A, while an aft attachment point 394 of the pylon 390 is attached to the aft transfer system 230, as illustrated at FIGS. 3B and 3C. As illustrated at FIG. 3C, where the first aft flange 234 is removed for clarity, the aft attachment point 394 is attached to the crank 240 via a second pin 246 configured to extend through a second aperture 248 and to mate with an aperture or similar fitting at the aft attachment point 394. The first pin 242 and the first aperture 244, used to pivotally attach the crank 240 to the transfer fitting 232, facilitate some adjustment or tolerance when attaching the crank 240 to the aft attachment point 394. Note that prior to attaching the aft attachment point to the crank 240, the aft transfer system 230 and, more particularly, the aft transfer fitting 232, is releasably attached to the first aft flange 234 and the second aft flange 236 via a first bolt 250 (or a first set of bolts) at each of the first aft flange 234 and the second aft flange 236. As illustrated in FIG. 2A, the aft transfer fitting may include a plate 235 or similar surface configured to mate with the first aft flange 234 and the second aft flange 236.

Figure 4:
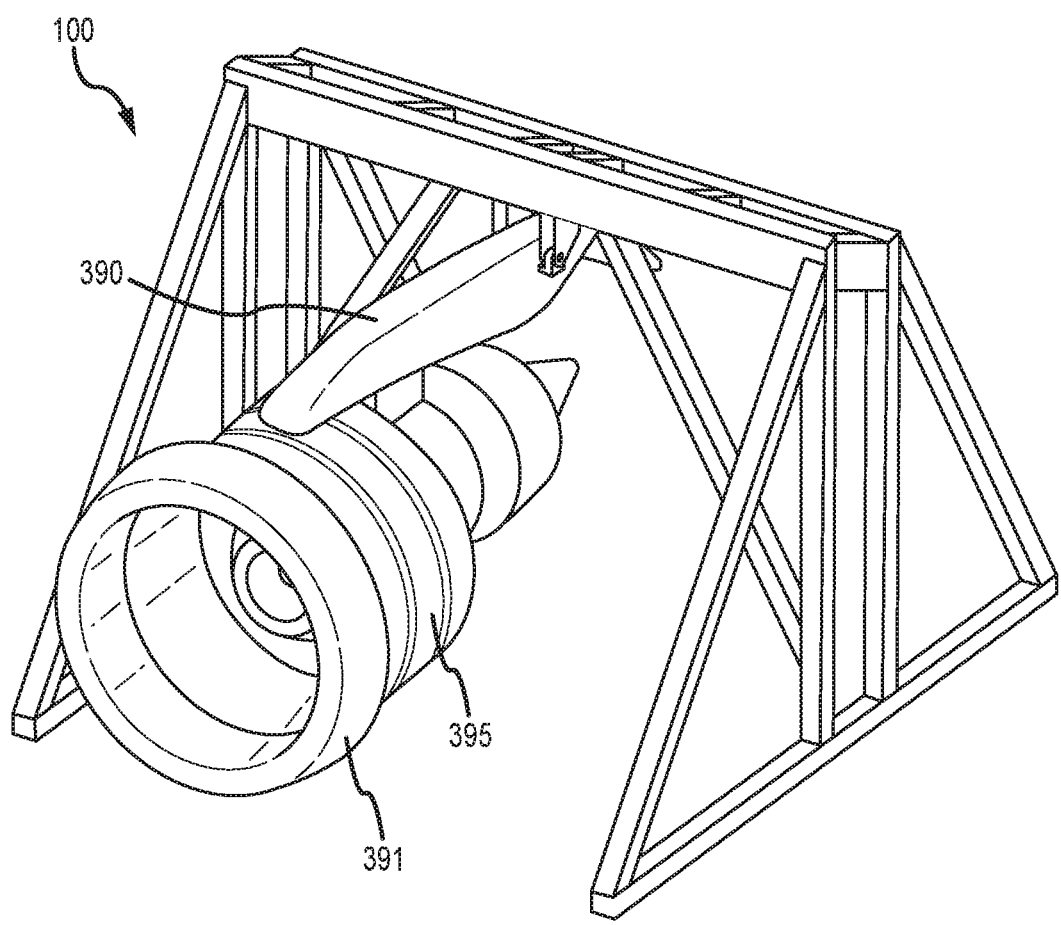
FIG. 4 illustrates an engine attached to the pylon illustrated in FIG. 3A, in accordance with various embodiments.
Figure 5:
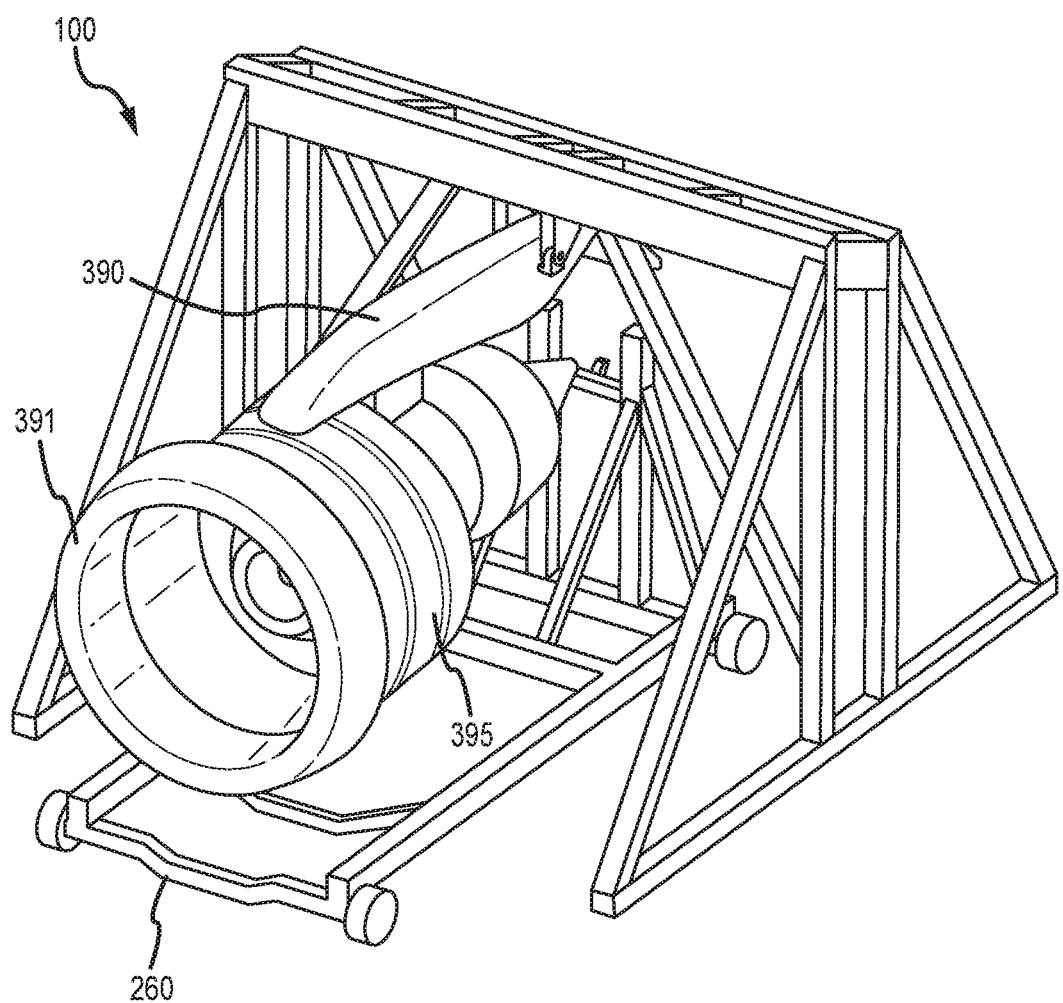
FIG. 5 illustrates a transfer cart positioned underneath the engine illustrated in FIG. 4, in accordance with various embodiments.

Referring now to FIG. 4, at a second step, an engine 395 is attached to the pylon 390 using conventional techniques. For example, the engine 395 may be lifted upward, such that mounting structure on both the pylon 390 and the engine 395 are aligned and the appropriate mounting hardware is used to secure the engine 395 to the pylon 390. As illustrated, various of the surrounding structure for the engine 395, such as, for example, an inlet cowl 391, may also be attached to the engine 395, either before or after it is attached to the pylon 390. While not illustrated, other components of the engine or the surrounding structure, including, for example, the thrust reverser, the exhaust and the fan cowls, may also be installed to complete the build or assembly of a podded engine. Referring now to FIG. 5, in a third step a transfer cart 260 is positioned under the engine 395. Various features of the transfer cart 260 are described below when describing further steps of the method.

Figure 6A:
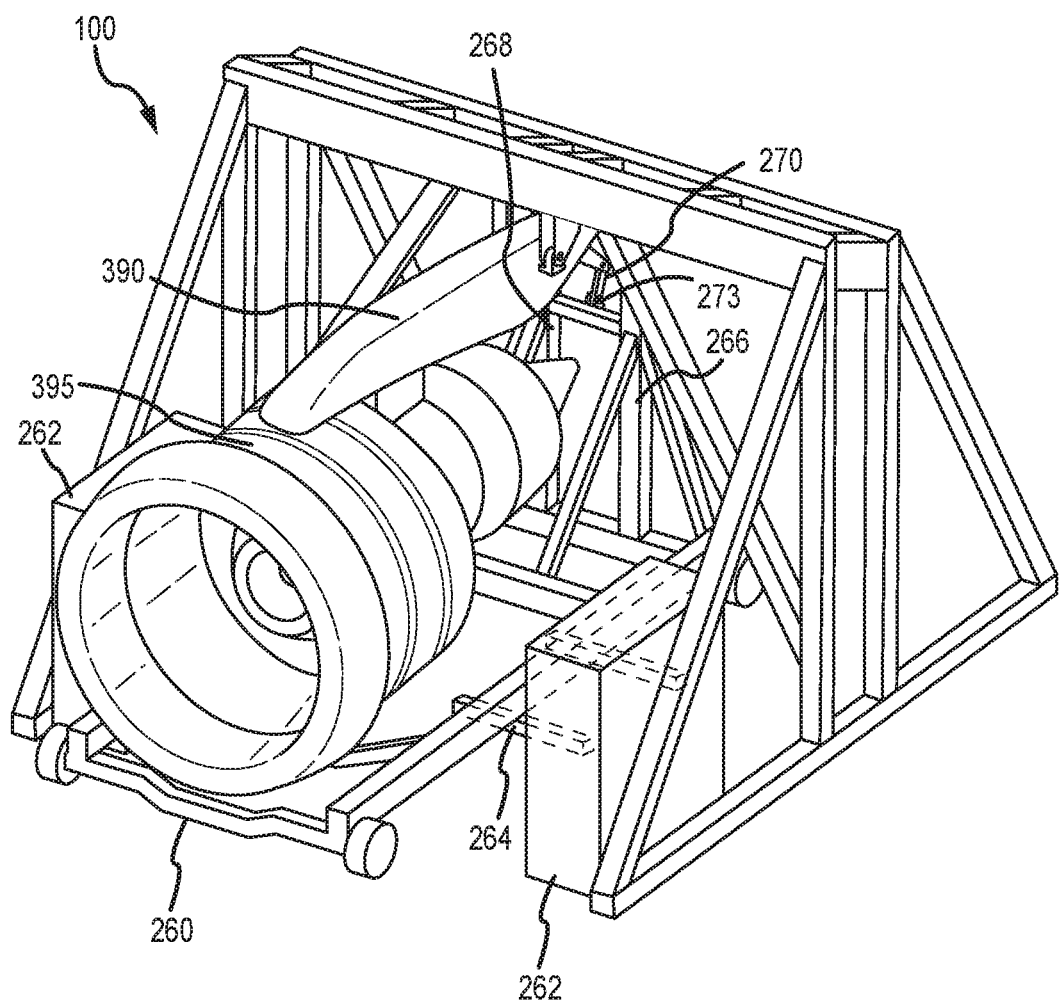
FIG. 6A illustrates the transfer cart illustrated in FIG. 5 being raised toward the engine illustrated in FIG. 4, in accordance with various embodiments.
Figure 6B:
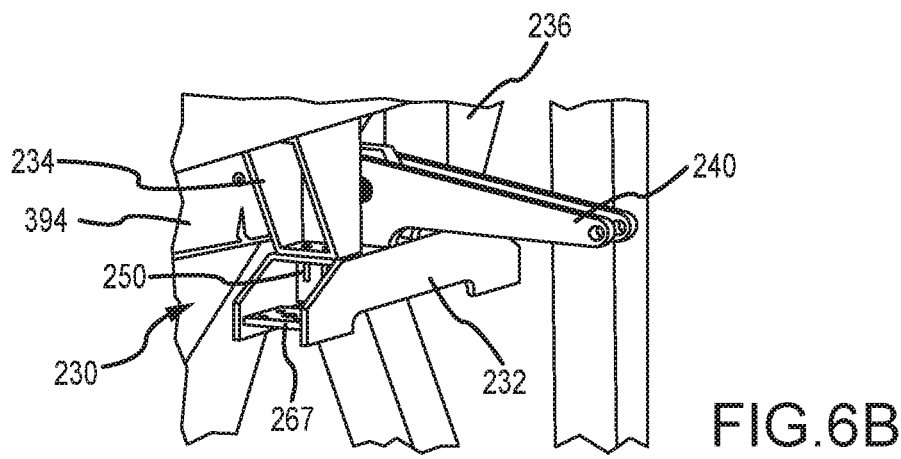
FIGS. 6B, 6C and 6D illustrate details of connecting and disconnecting an aft attachment point of the pylon illustrated in FIG. 4 to an aft transfer system, in accordance with various embodiments.
Figure 6C:
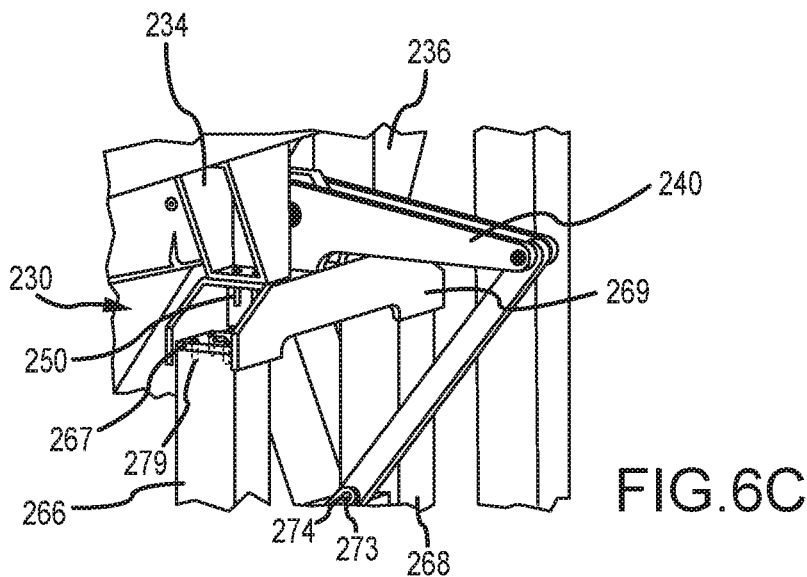
Figure 6D:
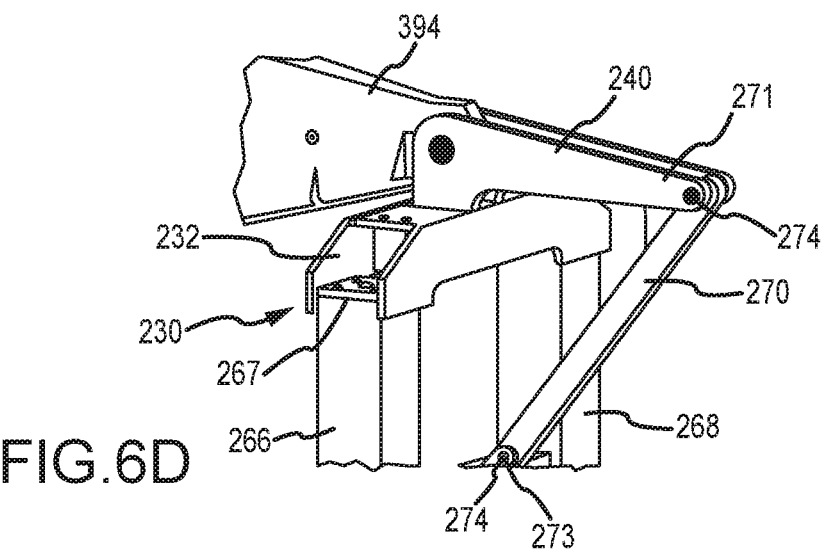

Referring now to FIGS. 6A, 6B, 6C and 6D, a fourth step includes lifting or raising the transfer cart 260 upward for attachment to the engine 395. In various embodiments, the transfer cart 260 is lifted or raised upward to the engine 395 via a power lifting device 262, which enables precision movement of large and heavy loads. In various embodiments, for example, the power lifting device 262 may include one or more forks 264 that extend under the transfer cart 260, similar to those used on a forklift. Referring now to FIGS. 6B, 6C and 6D, various features of the aft transfer system 230 and the transfer cart 260 are described. Referring first to FIG. 6B, the aft attachment point 394 of the pylon is illustrated attached to the crank 240, similar to the attachment described above with reference to FIGS. 3B and 3C. Further, and as described above, for example, the aft transfer fitting 232, is releasably attached to the first aft flange 234 and the second aft flange 236 via the first bolt 250 (or the first set of bolts) at each of the first aft flange 234 and the second aft flange 236. Referring to FIG. 6C, as the transfer cart 260 is raised, a first support member 266 and a second support member 268, both of which are attached to and a part of the transfer cart 260, are brought into contact with a first plate 267 (at a first side of the transfer fitting 232) and a second plate 269 (at a second side of the transfer fitting 232), respectively, of the aft transfer fitting 232 and releasably attached thereto via a second bolt 279 (or a second set of bolts) at each of the first plate 267 and the second plate 269. Following releasable attachment of the first support member 266 to the first plate 267 and the second support member 268 to the second plate 269, the first bolt 250 (or the first set of bolts) may be removed, thereby releasing the aft transfer fitting 232 from the first aft flange 234 and from the second aft flange 236 (the flanges are removed from the illustration for clarity). In addition, following releasable attachment of the first support member 266 to the first plate 267 and the second support member 268 to the second plate 269, a thrust link 270 may be attached to and between an aft end 271 of the crank 240 and an aft attachment point 273 of the transfer cart 260. In various embodiments, the thrust link 270 is secured at a first end to the aft end 271 of the crank 240 and at a second end to the aft attachment point 273 of the transfer cart 260 via pins or similar mounting structure.

Figure 7:
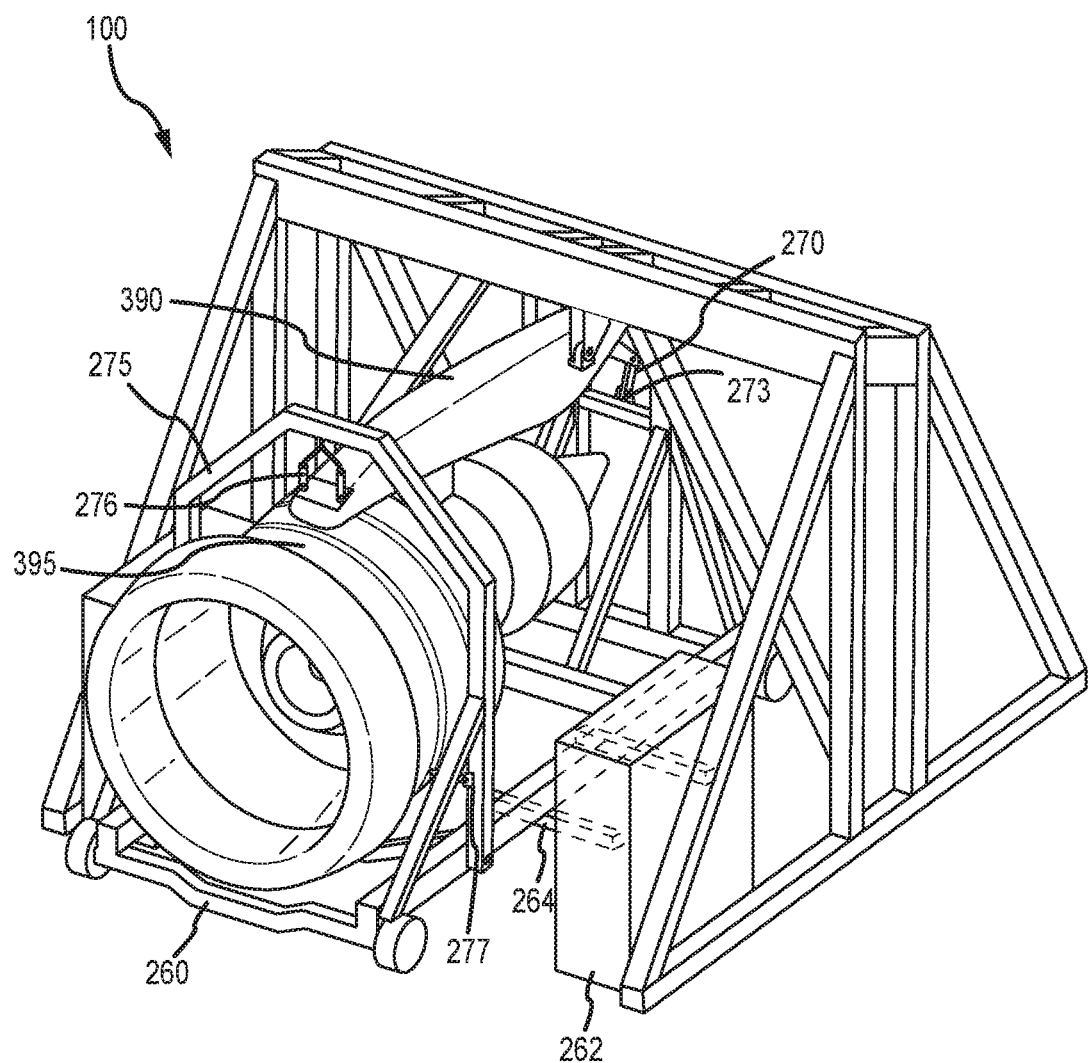
FIG. 7 illustrates a halo structure of the transfer cart illustrated in FIG. 5, in accordance with various embodiments.

Referring now to FIG. 7, a fifth step includes attaching a halo structure 275 to the transfer cart 260 and then attaching the engine 395 to the halo structure 275. In various embodiments, the halo structure 275 comprises a structural member configured to surround the engine 395 proximate a forward end of the pylon 390, which is also typically proximate a center of gravity of the engine 395. In various embodiments, the engine 395 is attached to the halo structure 275 via a harness 276, that may include one or more attachment points between the harness 276 and an upper portion of the engine 395 (two attachment points are illustrated). The harness 276 prevents the engine 375 from movement in the vertical direction with respect to the transfer cart 260. In various embodiments, the engine 395 is also attached to the halo structure 275 via a first side link 277 and a second side link opposite the first side link (hidden from view). The side links secure the sides of the engine 395 to the halo structure 275 and prevent movement of the engine in the transverse (or side to side) direction with respect to the transfer cart 260. In various embodiments, one or both of the first side link 277 and the second side link may comprise a three-point link (e.g., a banana link), with two points of attachment to the halo structure 275 to counter rotation of the engine 395 with respect to the transfer cart 260. With the halo structure 275 and each of the harness 276, the first side link 277, and the second side link attached to the engine 375, together with the transfer fitting 232 and the thrust link 270 attached as described above, the engine 395 is constrained from movement in six degrees of freedom with respect to the transfer cart 260, including movement in the forward and aft direction, the transverse or side to side direction, the vertical direction and in the yaw, pitch and roll directions.

Figure 8:
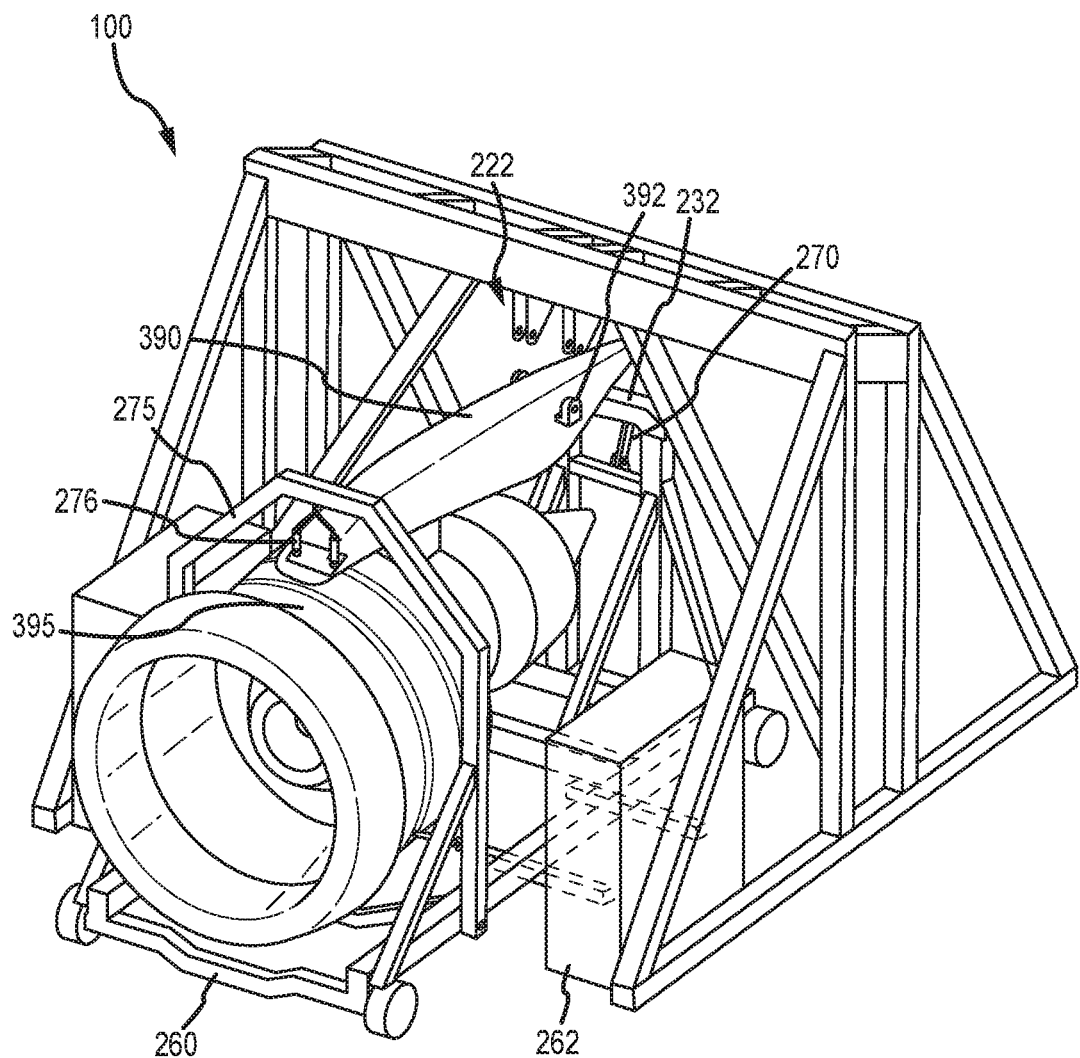
FIG. 8 illustrates the transfer cart, the engine and the pylon illustrated in FIG. 7 being lowered from the build frame, in accordance with various embodiments.

Referring now to FIG. 8, a sixth step includes lowering the engine 395, which is now securely fastened to the transfer cart 260 as described above, from the build frame 100. In various embodiments, the forward attachment point 392 of the pylon 390 is first unattached or disconnected from the forward fitting assembly 222. Once disconnected, the pylon 390 and the engine 395 are now completely disconnected from the build frame 100. The power lifting device 262 is then used to lower the transfer cart 260 to the ground, together with the engine 395 and the pylon 390 attached thereto. As described above, at this point the engine 395 is constrained from movement in six degrees of freedom with respect to the transfer cart 260, thus enabling transport of the engine 395 and the pylon 390 to another location while being constrained from movement with respect to the transfer cart 260.

Figure 9:
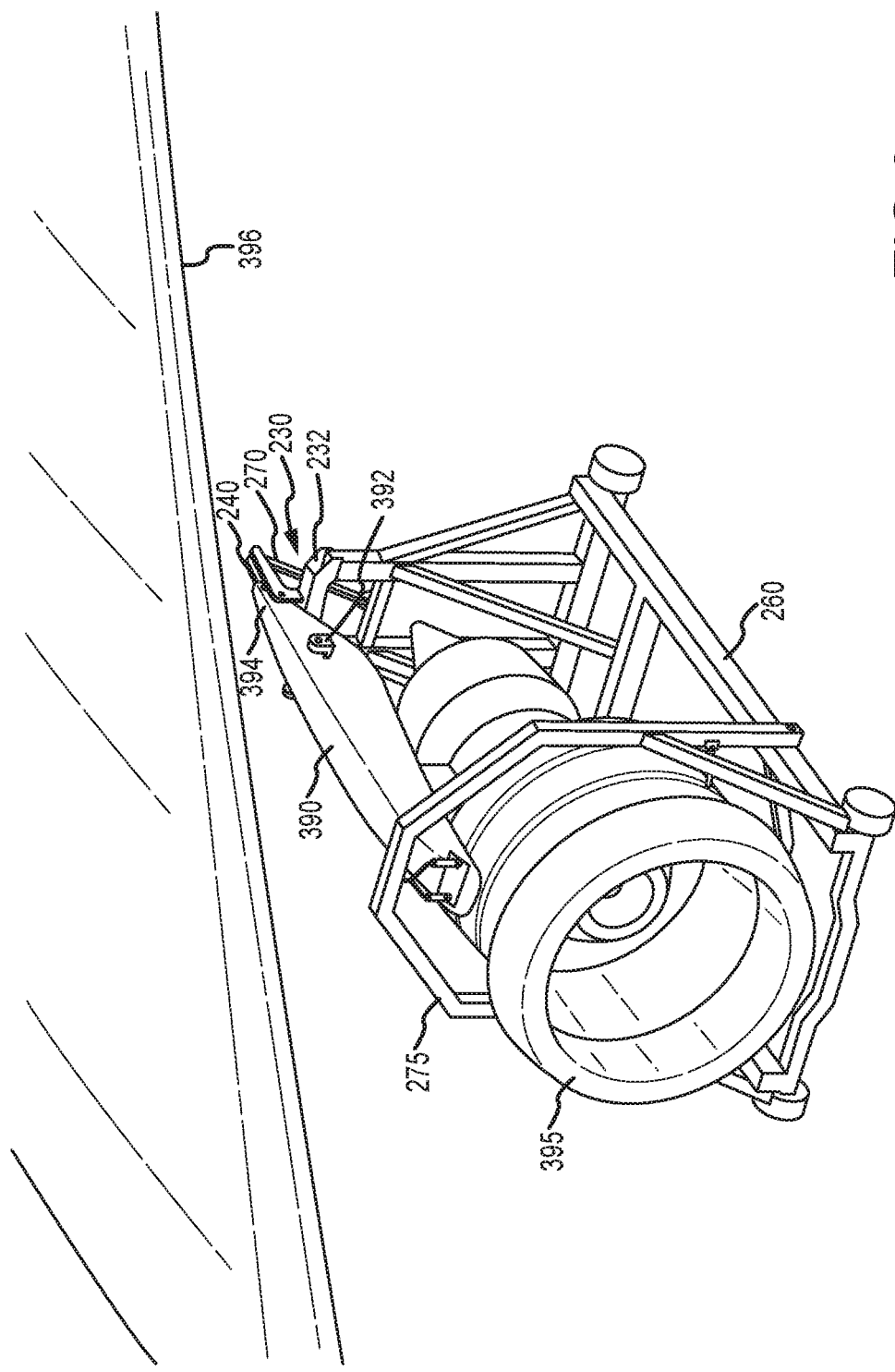
FIG. 9 illustrates the transfer cart, the engine and the pylon illustrated in FIG. 7 being transported to an underside of an aircraft wing, in accordance with various embodiments.
Figure 10:
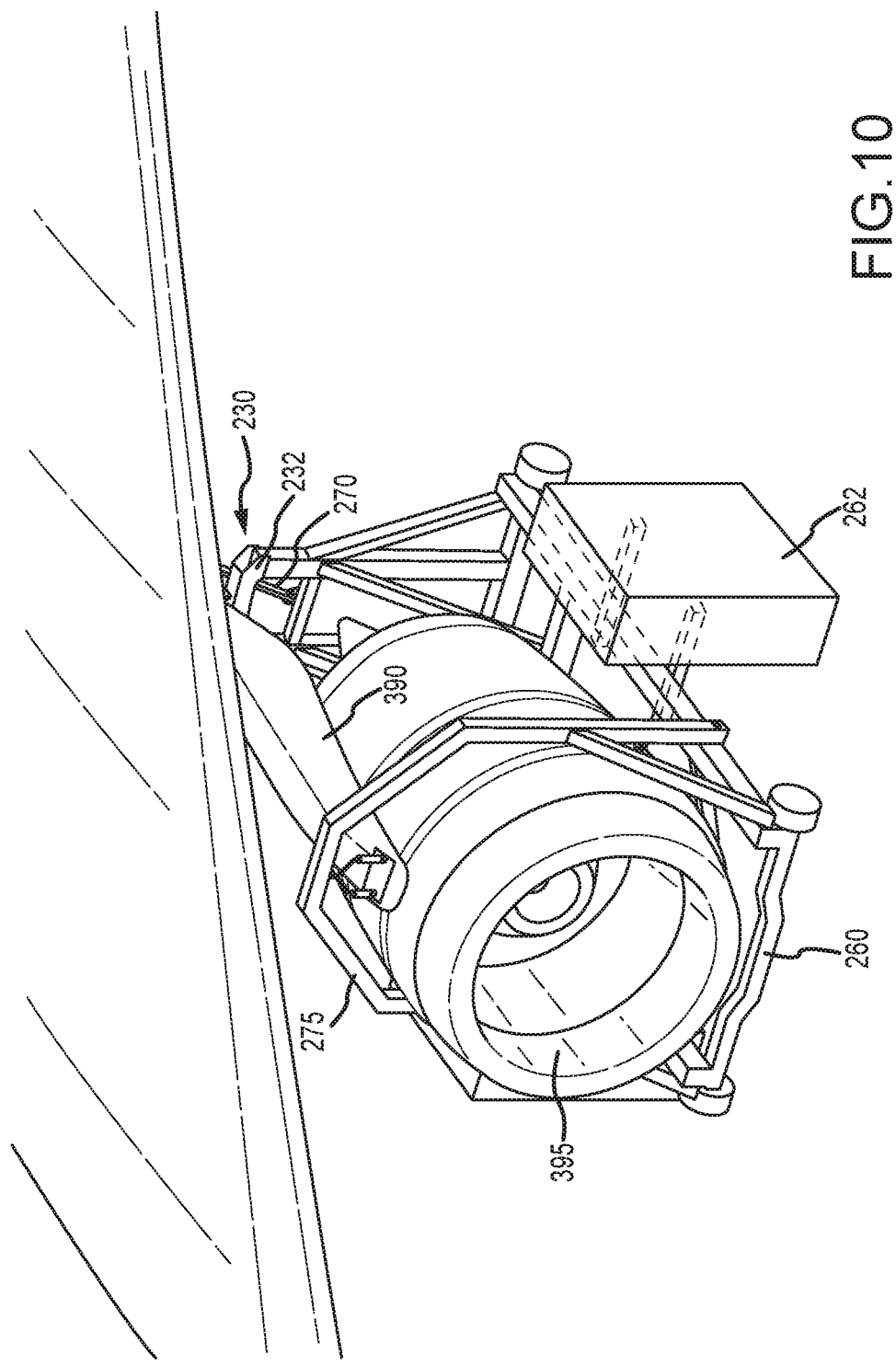
FIG. 10 illustrates a forward attachment point of the pylon being attached to the underside of the aircraft wing illustrated in FIG. 9, in accordance with various embodiments.
Figure 11:
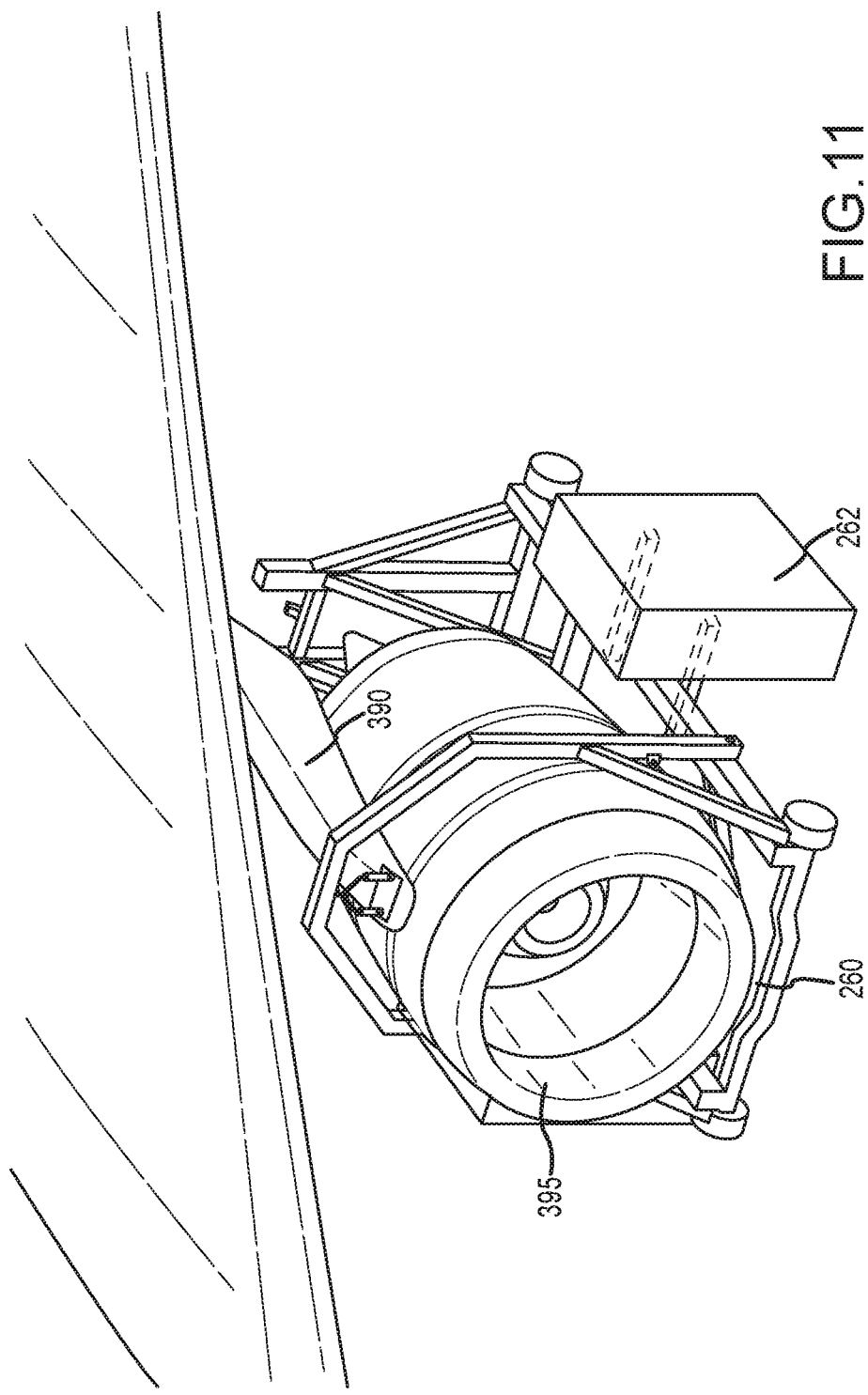
FIG. 11 illustrates removal of the aft transfer system from the pylon, in accordance with various embodiments.
Figure 12:
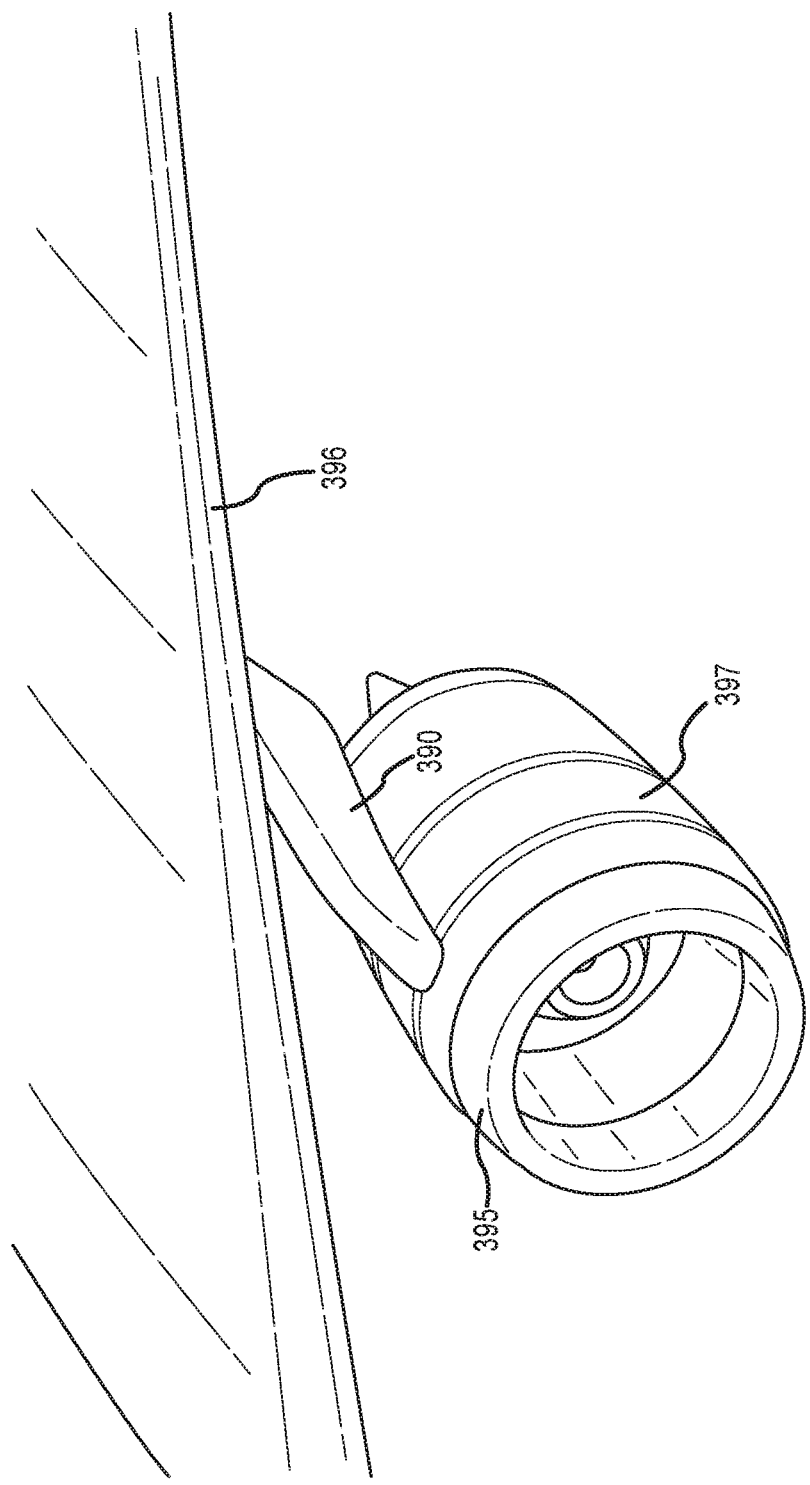
FIG. 12 illustrates a podded engine attached to the underside of the aircraft wing illustrated in FIG. 9, in accordance with various embodiments.

Referring now to FIG. 9, a seventh step includes transporting the engine 395 and the pylon 390, via the transfer cart 260, to the underside of an aircraft wing 396. As this juncture, and as described above, the engine 395 and the pylon 390 remain fully constrained from movement with respect to the transfer cart 260 via the aft transfer system 230 and the halo structure 275, together with the various attachment components described above. Referring now to FIG. 10 (with continued reference to FIG. 9), an eighth step includes raising the transfer cart 260, via the power lifting device 262, into position for attachment to the aircraft wing 396. Once raised into the attachment position and aligned with the forward attachment point of the aircraft wing 396, the forward attachment point 392 of the pylon 390 is attached to the forward attachment point of the aircraft wing 396 using conventional hardware configured for the attachment. Referring now to FIG. 11 (with continued reference to FIGS. 9 and 10), a ninth step includes disassembly and removal of the aft transfer system 230, including each of the transfer fitting 232, the crank 240 and the thrust link 270, from the aft attachment point 394 of the pylon 390. Note that because the forward attachment point 392 of the pylon 390 is secured to the aircraft wing 396 and the engine 395 remains secured to the halo structure 275, the aft transfer system 230 may be removed without the engine moving with respect to the transfer cart 260. Once the aft transfer system 230 is removed, the aft attachment point 394 of the pylon 390 is maneuvered via the power lifting device 262 into position for attachment to the aft attachment point of the aircraft wing 396. Following attachment of the forward and aft attachment points of the pylon 390 to the aircraft wing 396, a tenth step includes removal of the halo structure 275 and lowering of the transfer cart 260 via the power lifting device 262, leaving the engine 395 securely attached to the aircraft wing 396 via the pylon 390, as illustrated in FIG. 12. In an eleventh step, as also illustrated in FIG. 12, various of the remaining surrounding structure, including, for example, the fan cowls 397 may be assembled onto the engine 395.

Figure 13:
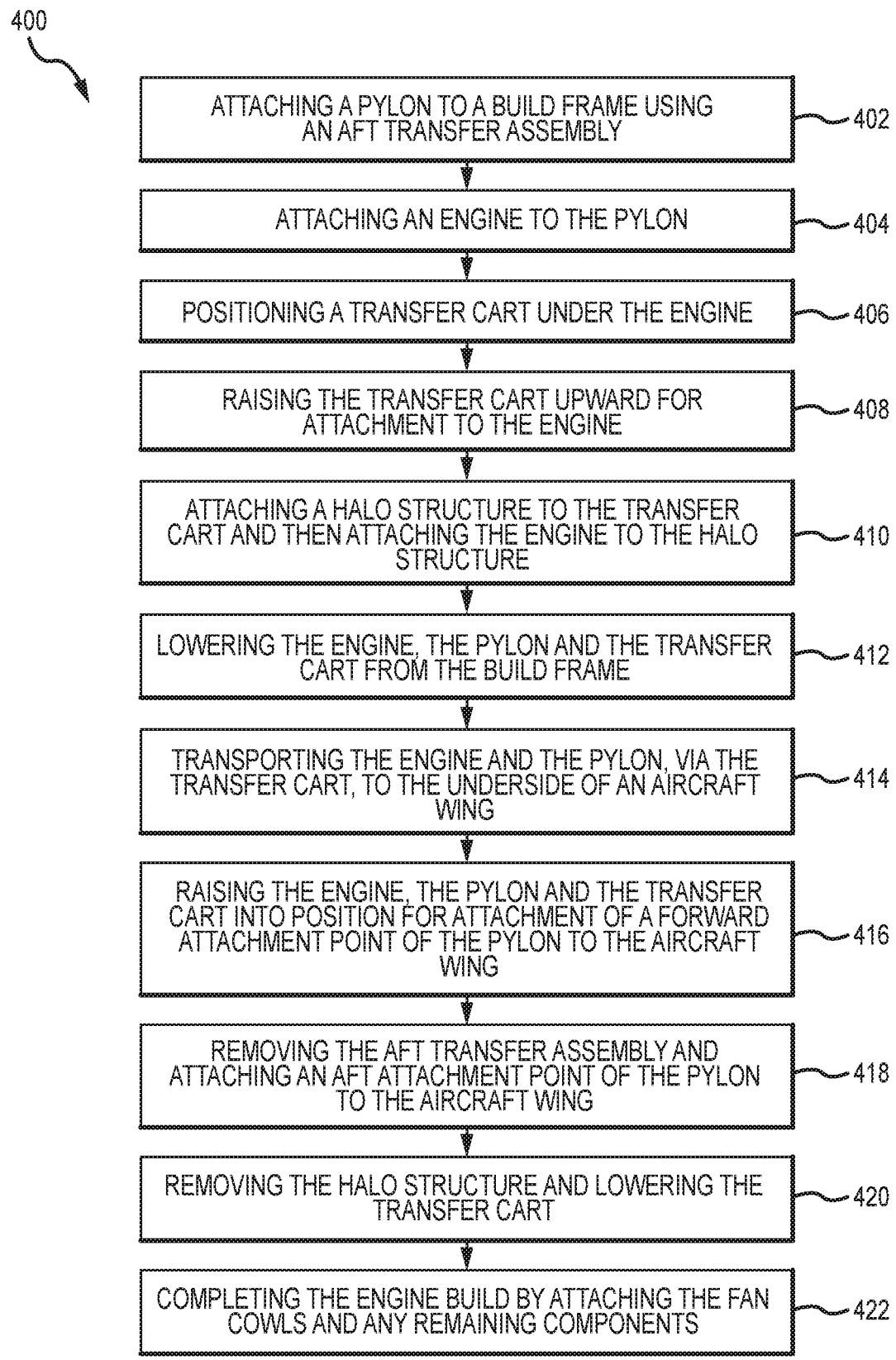
FIG. 13 describes various steps of a method for assembling and installing an engine to an underside of an aircraft wing, in accordance with various embodiments.

Referring now to FIG. 13, various steps described above may be summarized and described in the following method 400 of assembling and installing an underwing package to an underside of a wing, the underwing package generally comprising a pylon and an engine attached to the pylon. The engine, as described in this disclosure, may include, without limitation, a thrust reverser, various engine systems, an inlet cowl, an exhaust system and fan cowls. A first step 402 includes attaching a pylon to a build frame via an aft transfer system. A second step 404 includes attaching an engine to the pylon. A third step 406 includes positioning a transfer cart under the engine. A fourth step 408 includes raising the transfer cart upward for attachment to the engine. A fifth step 410 includes attaching a halo structure to the transfer cart and then attaching the engine to the halo structure. A sixth step 412 includes lowering the engine, the pylon and the transfer cart from the build frame. A seventh step 414 includes transporting the engine and the pylon, via the transfer cart, to the underside of an aircraft wing. An eighth step 416 includes raising the engine, the pylon and the transfer cart into position for attachment of a forward attachment point of the pylon to the aircraft wing. A ninth step 418 includes disassembly and removal of the aft transfer system and attachment of an aft attachment point of the pylon to the aircraft wing. A tenth step 420 includes removal of the halo structure and lowering of the transfer cart. An eleventh step 422 includes completing the engine build by attaching the fan cowls and any remaining components of the surrounding structure.

Benefits, other advantages, and solutions to problems have been described herein with regard to specific embodiments. Furthermore, the connecting lines shown in the various figures contained herein are intended to represent exemplary functional relationships or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method of assembling and installing an underwing package to an underside of an aircraft wing, comprising:
    attaching a pylon to a build frame;
    assembling the underwing package, comprising at least the pylon and an engine, using the build frame;
    attaching a transfer cart to the underwing package;
    lowering the underwing package and the transfer cart from the build frame;
    transporting the underwing package and the transfer cart to the underside of the aircraft wing; and
    transferring the underwing package from the transfer cart to the underside of the aircraft wing,
    wherein the attaching the pylon to the build frame includes attaching a forward attachment point of the pylon to a forward fitting of the build frame, releasably attaching an aft transfer system to the build frame, attaching an aft attachment point of the pylon to the aft transfer system, the aft transfer fitting including a crank that is pivotally connected directly to a transfer fitting,
    wherein the attaching the aft attachment point of the pylon to the aft transfer system includes attaching the aft attachment point of the pylon to the crank, and
    wherein the attaching the transfer cart to the underwing package includes connecting a thrust link between the aft transfer system and the transfer cart.

2. The method of claim 1, wherein transferring the underwing package from the transfer cart to the underside of the aircraft wing includes raising the transfer cart and the underwing package to the underside of the aircraft wing until the pylon is aligned with an attachment point at the underside of the aircraft wing.

3. The method of claim 2, further comprising attaching the pylon to the attachment point at the underside of the aircraft wing, thereby securing the underwing package to the aircraft wing.

4. The method of claim 3, further comprising lowering the transfer cart from the underwing package after securing the underwing package to the aircraft wing.

5. The method of claim 1, wherein assembling the underwing package includes attaching the engine to the pylon after attaching the forward attachment point of the pylon to the forward fitting of the build frame and attaching the aft attachment point of the pylon to the aft transfer system.

6. The method of claim 5, wherein attaching the transfer cart to the underwing package includes raising the transfer cart to an attachment position with respect to the underwing package.

7. The method of claim 6, wherein attaching the transfer cart to the underwing package includes releasably attaching a support member connected to the transfer cart to the aft transfer system.

8. The method of claim 7, wherein attaching the transfer cart to the underwing package includes attaching a halo structure to the transfer cart and connecting the halo structure to the engine.

9. The method of claim 8, wherein connecting the halo structure to the engine includes connecting a harness between an upper portion of the engine and the halo structure.

10. The method of claim 9, wherein connecting the halo structure to the engine includes connecting a first side link between a first side of the engine and the halo structure and a second side link between a second side of the engine and the halo structure.

11. The method of claim 8, further comprising releasing the aft transfer system from the build frame and releasing the forward attachment point of the pylon from the forward fitting of the build frame, followed by lowering the underwing package and the transfer cart from the build frame.

12. An aft transfer system for use with a build frame and a transfer cart during an assembly and installation of an underwing package, including a pylon, to an underside of an aircraft wing, comprising:

a transfer fitting is releasably attached to the build frame and configured for releasable attachment to the transfer cart;

wherein the build frame is attached to the pylon;

a crank pivotally connected directly to the transfer fitting and configured for releasable attachment to an aft attachment point of the pylon; and a thrust link connected between the crank and an aft attachment point of the transfer cart.

13. The aft transfer system of claim 12, wherein the transfer fitting includes a first plate configured for releasable attachment to a flange connected to the build frame.

14. The aft transfer system of claim 13, wherein the transfer fitting includes a second plate configured for releasable attachment to a support member connected to the transfer cart.

15. The aft transfer system of claim 14, further comprising a thrust link having a first end configured for attachment to the crank and a second end configured for attachment to an aft end of the transfer cart.

* * * * *